United States Patent [19]

Claque et al.

[11] Patent Number: 4,466,084
[45] Date of Patent: Aug. 14, 1984

[54] SEISMOMETER

[75] Inventors: Ghislain Claque, Etampes; André Meesters, Verrieres-le-Buisson, both of, France

[73] Assignee: Commissariat a l'Energie Atomique, Paris, France

[21] Appl. No.: 253,289

[22] Filed: Apr. 13, 1981

[30] Foreign Application Priority Data

Apr. 15, 1980 [FR] France .................. 80 08409

[51] Int. Cl.³ .................. G01C 1/42; G01P 15/09
[52] U.S. Cl. .................. 367/182; 367/184; 73/652
[58] Field of Search .................. 367/182, 184, 188; 73/652, 649; 181/122

[56] References Cited

U.S. PATENT DOCUMENTS

| 2,286,386 | 6/1942 | Silverman | 367/184 |
| 2,659,065 | 11/1953 | Cordell | 367/184 |
| 2,933,715 | 4/1960 | Beuermann | 367/184 |
| 4,364,033 | 12/1982 | Tsay | 181/122 |

FOREIGN PATENT DOCUMENTS

| 14656 | 8/1980 | European Pat. Off. | 367/182 |
| 707257 | 5/1941 | Fed. Rep. of Germany | 367/182 |
| 1177352 | 9/1964 | Fed. Rep. of Germany | 367/184 |
| 2303104 | 7/1974 | Fed. Rep. of Germany | 367/188 |
| 292288 | 7/1965 | Netherlands | 367/182 |
| 651283 | 5/1979 | U.S.S.R. | 367/182 |

OTHER PUBLICATIONS

"Film-Recording Seismograph," 5/4, pp. 89–92, Electronics.
"The Galitzin Seismographs", 4/13/23, pp. 474–476, Engineering.

Primary Examiner—Nelson Moskowitz
Attorney, Agent, or Firm—Michael N. Meller

[57] ABSTRACT

A seismometer comprising a permanent magnet fixed to a supporting plate, a thin flexible blade, one of whose ends is embedded in a support which is itself fixed to the supporting plate and the other end of which carries a coil which moves freely in the air gap of the permanent magnet, and an electronic amplifier which amplifies the electromotive forces induced in the coil by a displacement of the coil in the air gap of the magnet.

This seismometer can be used more particularly in connection with the safety of the nuclear reactor in the case of an earthquake.

11 Claims, 7 Drawing Figures

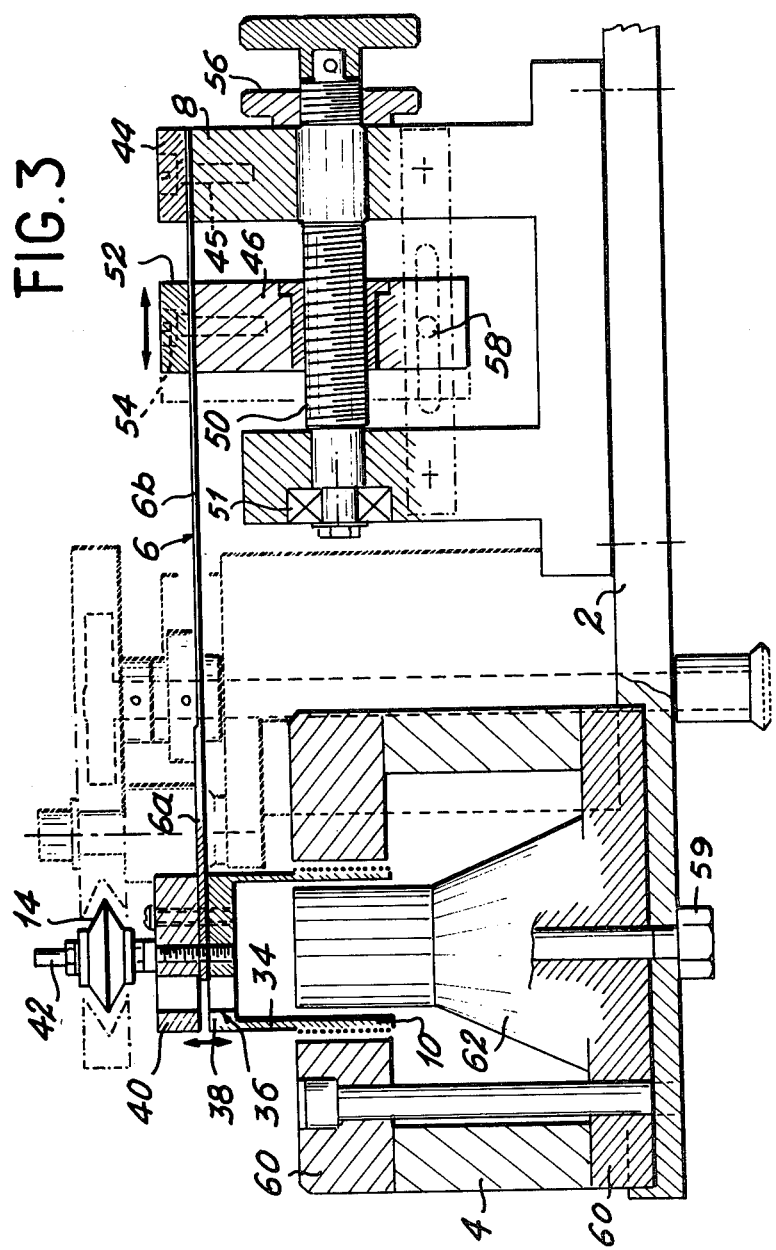

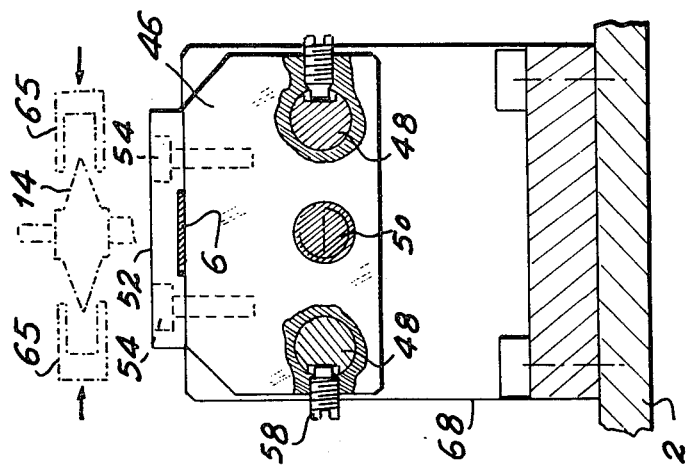
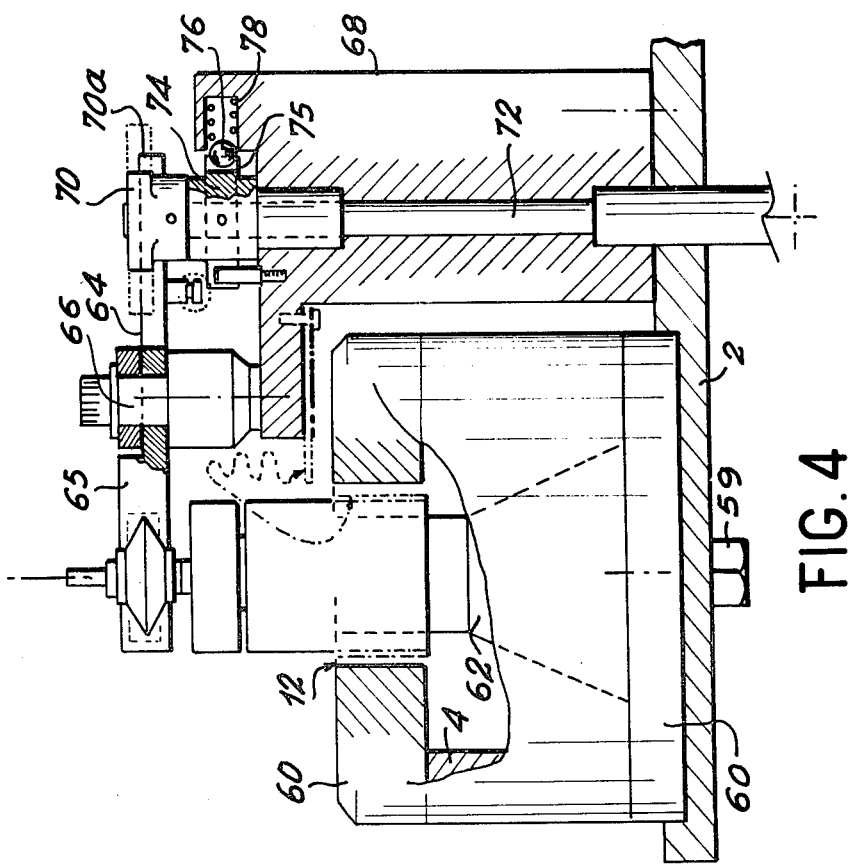
FIG. 5
FIG. 4

SEISMOMETER

BACKGROUND OF THE INVENTION

The present invention relates to a seismometer. It is known that seismometers measure ground shocks having either natural causes, such as earthquakes, or unnatural causes such as explosions. A modern seismometer comprises a ground displacement sensor which usually uses the inertia of a pendulum, a transducer which transforms into an electromotive force the displacement or displacement speed of the pendulum and an electronic amplifier which amplifies the electromotive force.

There are numerous French and foreign seismometer designs which can be subdivided into two main categories.

The first type has a higher performance level with regards to the sensitivity, with a natural frequency close to 1 Hz. They are generally calibratable and can be remotely tested. However, their mechanical design does not make it possible for them to measure high acceleration of approximately 0.2 g at 0.5 Hz. Such accelerations cause excessive relative coilmagnet displacements in such equipment.

Other less sensitive seismometers have a natural frequency generally equal to or above 1 Hz, and are able to measure significant displacements. In general, they have no calibration coil and there is no possibility of finely adjusting the natural frequency. Normally, they are not equipped with internal electronics.

BRIEF SUMMARY OF THE INVENTION

The seismometer according to the invention combines the advantages of the two aforementioned seismometer types. It has a high sensitivity level, whilst permitting the measurement of significant accelerations.

Due to these characteristics, the present seismometer can be used with particular advantage in connection with the safety of a nuclear reactor in the case of an earthquake. For such an application, it is advantageous that the seismometer can measure accelerations between 0.01 and 0.2 g in the frequency range between 0.5 and 30 Hz. One vertical measuring channel and two horizontal measuring channels are required. In this way, a system of three sensors is formed, which is able to measure the intensity of the earthquake along three axes.

A system with three electronic measuring channels is installed at approximately 250 m from the sensors. A cable of considerable length transmits the signal supplied by the sensors to the electronic measuring system.

More specifically, the present invention relates to a seismometer, comprising a permanent magnet fixed to a supporting plate, a thin flexible blade, one of whose ends is embedded in a support which is itself fixed to the supporting plate and the other end of which carries a coil which moves freely in the air gap of the permanent magnet, and an electronic amplifier which amplifies the electromotive force induced in the coil by a displacement thereof in the air gap of the magnet.

Preferably, the profile of the thin flexible blade has a bulge in that part of the blade portion corresponding to the loop of the first partial vibration mode which is nearest to the end of the blade. In the case of a vibrating blade, it is known that there are vibration modes other than the fundamental mode. For this reason, in order to transfer the first partial mode to a higher frequency, the blade has been thickened in that part of the blade portion corresponding to the loop located in the vicinity of the end of the blade for said first partial mode.

Preferably, the flexible blade also has at its free end an additional mass which balances the weight of the coil in such a way that the centre of gravity of the moving element formed in this way is located in the axis of the profile of the flexible blade. This arrangement makes it possible to reduce the sensitivity of the seismometer to transverse loads.

To permit a fine setting of the natural frequency of the seismometer according to the invention, the flexible blade support incorporates means for regulating the length thereof.

BRIEF DESCRIPTION OF THE DRAWINGS

The invention is described in greater detail hereinafter relative to non-limitative embodiments and with reference to the attached drawings, wherein:

FIG. 3 is a partially sectioned view of the seismometer of FIG. 1.

FIG. 4 is a partially sectioned view more particularly showing the blocking device of the oscillating element.

FIG. 5 is a partially sectioned view showing the translationally movable member for adjusting the natural frequency of the flexible blade.

DETAILED DESCRIPTION OF THE PREFERRED EMBODIMENTS

Figure 1:
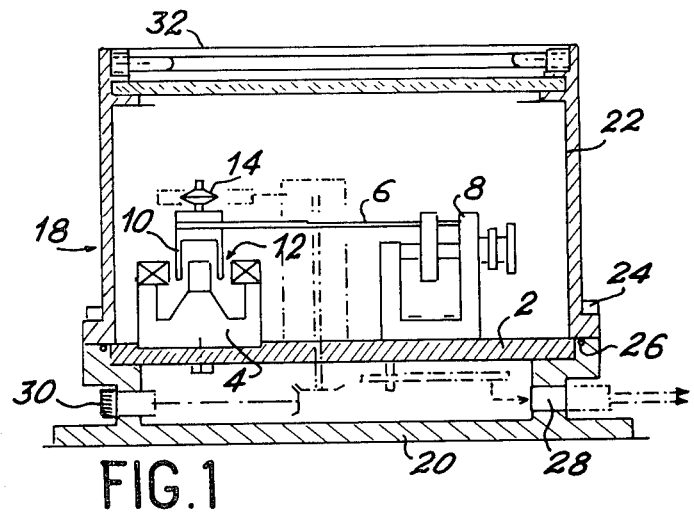
FIG. 1 is a diagrammatic view of a vertical seismometer according to the invention.
Figure 2:
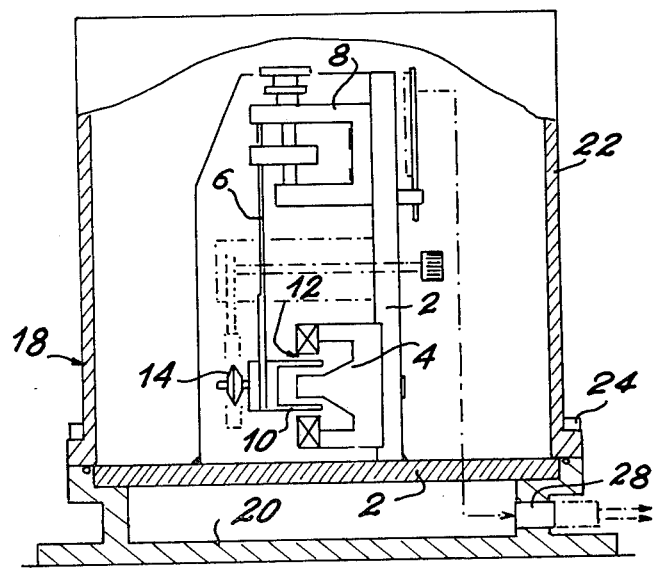
FIG. 2 is a diagrammatic view of a horizontal seismometer according to the invention.

FIGS. 1 and 2 show two constructional variants of a seismometer according to the invention. FIG. 1 shows a seismometer for measuring the vertical component of a ground shock, whilst the seismometer shown in FIG. 2 is used for measuring a horizontal component thereof. Thus, as is known, modern sensors have a single degree of freedom and record the component of the ground movement in one direction only. To obtain a complete recording, it is therefore necessary to have one sensor for the vertical component and two sensors for two perpendicular horizontal components "e.g." north—south and east—west.

In these drawings, reference numeral 2 designates the supporting plate, reference numeral 4 the permanent magnet and reference numeral 6 the flexible blade. One end of the flexible blade is embedded in a support 8, which is itself fixed to the supporting plate 2. At the other end of flexible blade 6 there is a coil 10, which moves freely in the air gap 12 of magnet 4. An additional mass 14 balances the weight of coil 10 in such a way that the center of gravity of the oscillating unit formed in this way is located on the axis of the profile of flexible blade 6.

The operating principle is the same for the two instruments and in particular the oscillating unit is the same. The two instruments are differentiated solely by certain constructional details. Thus, supporting plate 2 of the vertical seismometer is horizontal, whilst that of the horizontal seismometer is vertical. Another difference relates to the locking device for the oscillating unit which is used during transportation. In the case of the vertical seismometer, the locking device can be actuated from outside the instrument. However, in the case of the horizontal seismometer, the instrument must be opened to obtain access thereto.

The assembly constituted by supporting plate 2, magnet 4, the oscillating unit and support 8 is housed within a light alloy case 18 produced by casting. Case 18 is completely sealed and enables the seismometer to operate outdoors in all weathers. Case 18 is formed by a plate 20 and a bell 22 fixed to the plate by eigth bolts 24. The joint between plate 20 and bell 22 is made tight by an O-ring 26. Plate 20 also carries the tight outlet connector 28, the control device 30 of the locking system for the oscillating unit and finally a decompression plug (not shown). Bell 22 is provided with a handle 32 for transporting the instrument.

FIG. 3 is a detailed view of the vertical seismometer of FIG. 1. It is again possible to see supporting plate 2, magnet 4, flexible blade 6 embedded in support 8 at one of its ends and carrying at its other end a coil 10 balanced by an additional mass 14. The oscillating blade 6 is made from Chrysocal. In a prototype of the preferred embodiment, the dimensions are as follows: Its length is 10 cm and its width 1 cm. Its end 6a has a thickness of 1 mm, whilst that of end 6b is only 0.5 mm. This blade has been designed to oscillate in accordance with its fundamental mode at 5 Hz, when terminally loaded by the measuring coil 10 and by an additional mass 14. In the case of oscillating blades, it is known that there are oscillation modes other than the fundamental mode, the partial modes resonating at frequencies higher than those of the fundamental mode. If this oscillating blade 6 had a constant thickness, this first partial mode would be approximately 31 Hz. In order to transfer the latter to a higher frequency, blade 6 has been thickened in that part of the blade portion corresponding to loop positioned in the vicinity of the end of the blade for this mode. This thickness has been increased to 1 mm which, with a fundamental mode of frequency 5 Hz, makes it possible to raise the frequency of the first partial mode to a value exceeding 70 Hz.

Furthermore, the overvoltage coefficient obtained on this first partial mode has been greatly reduced by ensuring vacuum electrodynamic damping by eddy current circulation in the holding device 34 of coil 10, the holding device 34 being made from aluminum. By adjusting the ohmic resistance of holding device 34 three openings made in the latter make it possible to set the vacuum damping coefficient of the equivalent pendulum to a value of 0.5.

Coil 10 comprises 2000 copper wire turns having a diameter of 0.56 mm. This wire is wound onto holding device 34, which is itself fixed to a plexiglass support 36. Coil 10 is fixed to the blade 6 by means of two washers 38, 40 fixed by the threaded rod 42. Coil 10 also comprises a secondary winding of 200 turns, making it possible to calibrate the sensor. The additional mass 14, which is also fixed to coil 10 and to washers 38, 40 by means of threaded rod 42, makes it possible to obtain a natural frequency of 5 Hz with blade 6. It also makes it possible to place the center of gravity of the oscillating unit (i.e., 10, 34, 38, 40, 42, and 14) in the plane of blade 6, i.e. to reduce the sensitivity to transverse loads. Finally, the additional mass 14 can be locked by clips permitting the immobilization of the oscillating unit during transportation of the seismometer.

The natural frequency of the seismometer according to the invention can be accurately adjusted. This natural frequency can be varied by regulating the length of flexible blade 6. Therefore, the end of flexible blade 6 is secured to support 8 by a small plate 44 fixed by screws 45. Member 46, which is mobile in translation, slides on two spindles 48 lying parallel to the axis of flexible blade 6. A micrometer screw 50, mounted at one of its ends in a ball bearing 51, makes it possible to accurately regulate the position of translatable member 46. A small plate 52 secured by screws 54 engages flexible plate 6 on member 46. A lock nut 56 makes it possible to lock screw 50 in rotation. Two screws 58 lock member 46 on each of the spindles 48.

Magnet 4 is fixed to the supporting plate 2 by a screw 59, so that it is fixed relative to the ground. The magnet is a cylindrical Ticonal (24% Co, 15% Ni, 8% Al, 3% Cn, remainder Fe) magnet having two armatures 60 and a core 62 which defines a radial uniform magnetic field in a 4-mm-wide cylindrical air gap 12.

The seismometer according to the invention comprises a locking device for the oscillating unit, and this is more particularly shown in FIG. 4. It is constituted by two jaws 65 (only one of which is shown in FIG. 4) 64 pivoting about a pivot pin 66 fixed to a pivot support 68, itself fixed to the supporting plate 2. Spacer 70 is fixed to a first pin 72, which can be driven from the outside of the instrument via a second pin which is perpendicular to the first, said second pin being actuated by means of an external lever, this movement being transmitted from the first pin to the second via a, conical frame (not shown). The spacer 70 is shown with the device in the unlocked position. The dotted lines indicate the position of the spacer 70a in the locked position. A cam 74, defining the spacer position, is positioned below the latter. This cam has a slot 75 which engages a ball 76 secured by a spring 78.

FIG. 5 is a partially sectioned view which more particularly shows the device for regulating the natural frequency of the flexible blade 6. Member 46, which is mobile in translation and which is shown here from the front, slides on the two spindles 48. The micrometer screw 50, shown in section, makes it possible to accurately regulate the position of member 46. It is also possible to see the two screws 58, which lock the member 46 on each of the spindles 48. Small plate 52 secured by screws 54 makes it possible to engage the flexible blade 6 on member 46.

FIG. 5 also shows (by means of dotted lines), the additional mass 14 and the two jaws 65 permitting the locking thereof during the transportation of the instrument.

Figure 6:
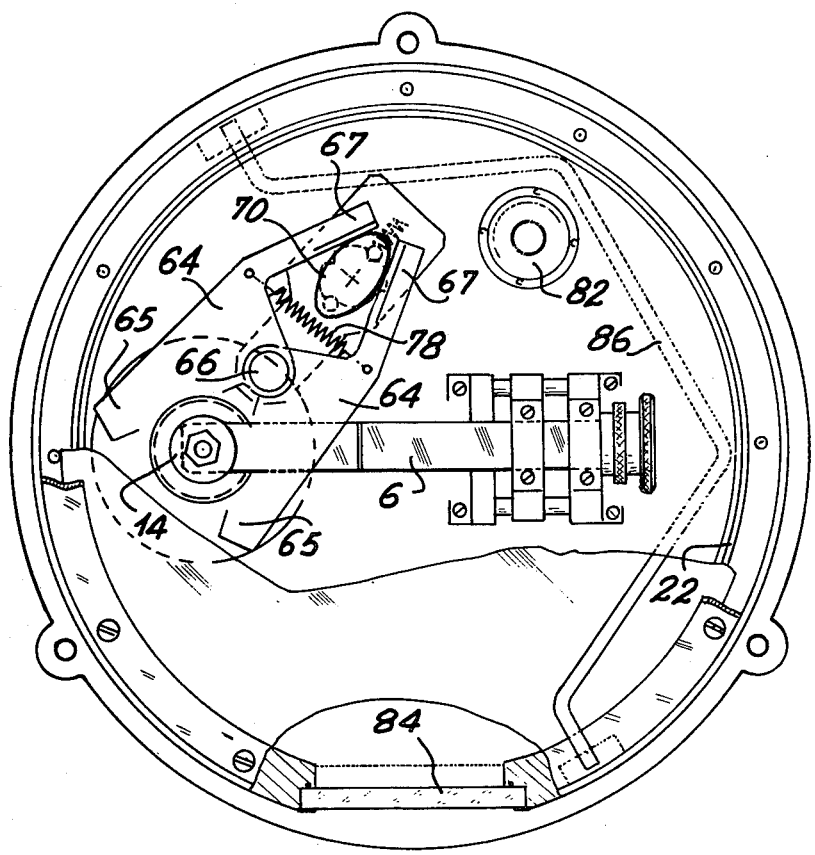
FIG. 6 is a plan view of a vertical seismometer according to the invention.

FIG. 6 is a plan view of a vertical seismometer according to the invention. This drawing shows member 64, which is centrally articulated about a point 66. It is possible to see the shape of the jaws 65, which are able to tightly secure the additional mass 14. Spring 78 urges the second ends 67 of member 64 toward each other. Spacer 70 is shown with jaws 65 in the disengaged (unlocked) position. Upon pivoting spacer 70 by 90° by means of an external control acting counter to the tension of spring 78, the spacer moves apart ends 67 of members 64, which has the effect that jaws 65 are moved to engage additional mass 14, thereby locking the oscillating unit carried by flexible blade 6.

The bell 22, shown in sectional form, comprises two ports, the first being located on the upper horizontal part and making it possible to inspect all of the parts of the oscillating unit, and, together with the level indication bubble device 82, making it possible to check the horizontal position of the seismometer. This first port is not shown in FIG. 6. The bell 22 incorporates a second port, designated by the reference numeral 84 in FIG. 6. Port 84, located in the lateral part of the bell, makes it possible to accurately check the satisfactory positioning of the measuring coil 10 in air gap 12 of magnet 4. The two ports are engaged on bell 22 by means of two screwed-down rings which compress an O-ring. In the upper part of bell 22, there is also a retractable transportation lever 86.

Figure 7:
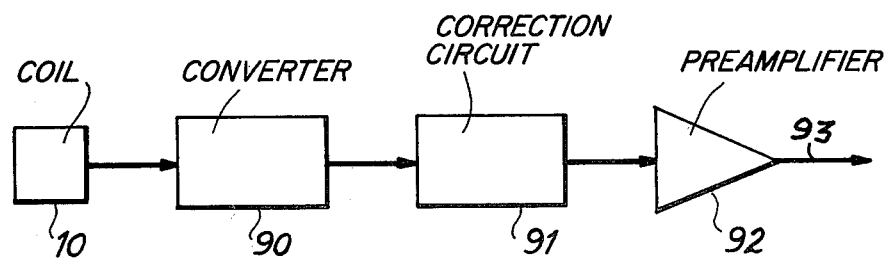
FIG. 7 is a diagrammatic view of the amplification means positioned at the seismometer output.

FIG. 7 is a block diagram of the amplification means located at the seismometer output. These amplification means comprise an impedance converter 90 connected to the moving coil 10, diagrammatically shown in the drawing. A correcting circuit 91 is connected to the output of converter 90 in order to correct the amplitude and phase of the transfer function of the system formed by the impedance converter 90 and the pendulum (i.e., the oscillating element). This correcting circuit makes it possible to lower the natural frequency of the equivalent pendulum so as to facilitate the measurement of low frequency signals by means of conventional measuring equipment. Finally, the amplification means comprise a preamplifier 92, whose output 93 supplies signals representing the electromotive force induced in the coil 10. This electromotive force is proportional to the displacement speed of the coil 10.

Due to its particularly advantageous characteristics, the sensor according to the invention can be used in connection with the safety of a nuclear reactor. In this case, the high level signal which it supplies is transmitted via a very long cable to a centralized signal processing electronic system. It is to be understood that the embodiment described above is presented for illustrative purposes only and is not intended to limit the scope of the present invention as claimed. In particular, it would be obvious to one of ordinary skill in the art to replace the materials specified in the disclose with materials having similar properties.

What is claimed is:

1. A seismometer comprising a permanent magnet fixed to a supporting plate, a thin flexible blade, the fixed end of which is embedded in a blade securement means fixed to said supporting plate, and the free end of which carries a coil which is freely movable in the air gap of said permanent magnet and an additional mass for balancing the weight of the coil in such a way that the center of gravity of the oscilatting unit formed by said coil and said additional mass is located substantially on the axis of the profile of said flexible blade, and an electronic amplifying means which amplifies the electromotive forces induced in the coil by movement of said coil in the air gap of said magnet, wherein the position of said additional mass is adjustable and wherein the profile of said flexible blade has a predetermined thickness along a predetermined length of the blade portion forming the loop of said blade nearest to the end of said blade corresponding to the first partial vibration mode, with the remainder of the profile having a thickness less than said predetermined thickness.

2. A seismometer according to claim 1, wherein said blade securement means comprises means for regulating the length of said blade which is capable of free oscillation.

3. A seismometer according to claim 2, wherein said means for regulating the oscillatable length of said flexible blade comprises first means for securing said blade at said fixed end and second means for securing said blade at a desired point located at a predetermined distance from said fixed end, said second means being translatable along the longitudinal axis of said blade and lockable at said desired point.

4. A seismometer according to claim 3, wherein said means for regulating the oscillatable length of said blade further comprises first and second spindles, arranged substantially parallel to the longitudinal axis of said flexible blade, on which said second means for securing said blade is translatably mounted, and further comprises a threaded screw capable of rotation but not translation, said second means being provided with a nut capable of interlocking with said screw such that said second means is displaced when said screw is rotated, and further comprises a lock nut for locking said screw to prevent rotation, and first and second locking screws for locking said second means on said first and second spindles, respectively, when said second means is positioned at said desired point.

5. A seismometer according to claim 1, further comprising first and second members for locking said oscilating unit, thereby precluding displacement, a pivot pin on which said first and second members are rotatably arranged, and a rotatable spacer of substantially elliptical shape, said members each having a jaw at a first end which is able to engage said additional mass for the purpose of locking and an arm at a second end which abuts said spacer, said arms being urged toward each other by a spring, and said jaws engaging said additional mass in response to the rotation of said spacer.

6. A seismometer according to claim 5, further comprising an assembly for remotely controlling the rotation of said spacer, said assembly comprising a first pin on the end of which said spacer is rigidly fixed, a second pin, a conical frame engageably connected to said first and second pins, a level operatively connected to said second pin, said spacer being rotated in response to operation of said lever, the position of said spacer corresponding to the unlocked condition being defined by a cam having a recess for engaging a ball urged against said cam by a spring.

7. A seismometer, according to claim 1, further comprising a tightly sealed housing, said housing in turn comprising a plate having a tight outlet connector, a bell, and a decompression plug, said plate and bell being rigidly joined by bolts, with a tight connection between said plate and bell being provided by an O-ring.

8. A seismometer according to claim 1, further comprising an aluminum cylinder on which said coil is wound, wherein said cylinder is provided with openings, as a result of which the ohmic resistance of said cylinder is adjusted, thereby making it possible to regulate the vacuum damping coefficient of the equivalent pendulum.

9. A seismometer according to claim 1, wherein said permanent magnet comprises first and second armatures and a core defining a cylindrical air gap in which a radial uniform magnetic field resides.

10. A seismometer according to claim 1, wherein said coil comprises a secondary winding for calibrating the seismometer.

11. A seismometer according to claim 1, wherein said amplifying means comprises an impedance converter electrically connected to said coil, a correcting circuit electrically connected to receive output from said converter for correcting the amplitude and phase of the transfer function of the system formed by said converter and the pendulum in such a way that the natural frequency of said pendulum is reduced, and a preamplifier for outputting signals representing the electromotive force induced in said coil, said force being proportional to the displacement speed of said coil.

* * * * *